United States Patent [19]

Lambert

[11] 4,314,771
[45] Feb. 9, 1982

[54] EXTENSION CONNECTOR

[76] Inventor: Hubert L. Lambert, Apt. A, 3512 Arcadia St., P.O. Box 413, Norfolk, Va. 23501

[21] Appl. No.: 81,112

[22] Filed: Oct. 2, 1979

[51] Int. Cl.³ .............................................. F16B 7/00
[52] U.S. Cl. .................................. 403/305; 403/306; 403/362; 16/115
[58] Field of Search ..................... 403/305, 306, 362; 15/143 B, 144 R; 16/115, 110 R, 114 R

[56] References Cited

U.S. PATENT DOCUMENTS

| | | | |
|---|---|---|---|
| 883,499 | 3/1908 | Smith | 403/305 |
| 1,074,839 | 10/1913 | Curry | 403/366 X |
| 1,336,603 | 4/1920 | Baker | 403/362 X |
| 1,555,847 | 10/1925 | Hudson | 403/306 |
| 1,647,802 | 11/1927 | Josef | 403/305 |

FOREIGN PATENT DOCUMENTS

| | | | |
|---|---|---|---|
| 2240821 | 2/1974 | Fed. Rep. of Germany | 16/115 |
| 720791 | 12/1931 | France | 403/306 |

*Primary Examiner*—Andrew V. Kundrat
*Attorney, Agent, or Firm*—Sixbey, Friedman & Leedom

[57] ABSTRACT

This connector consists primarily of a cylindrical sleeve, having thumb-screws for securing interior plates to a shaft of any desired length, and it will removably receive a paint brush, scraper or broom in the other end, so as to enable the user to pain, scrape and sweep high ceilings and over-hangs around a building.

5 Claims, 4 Drawing Figures

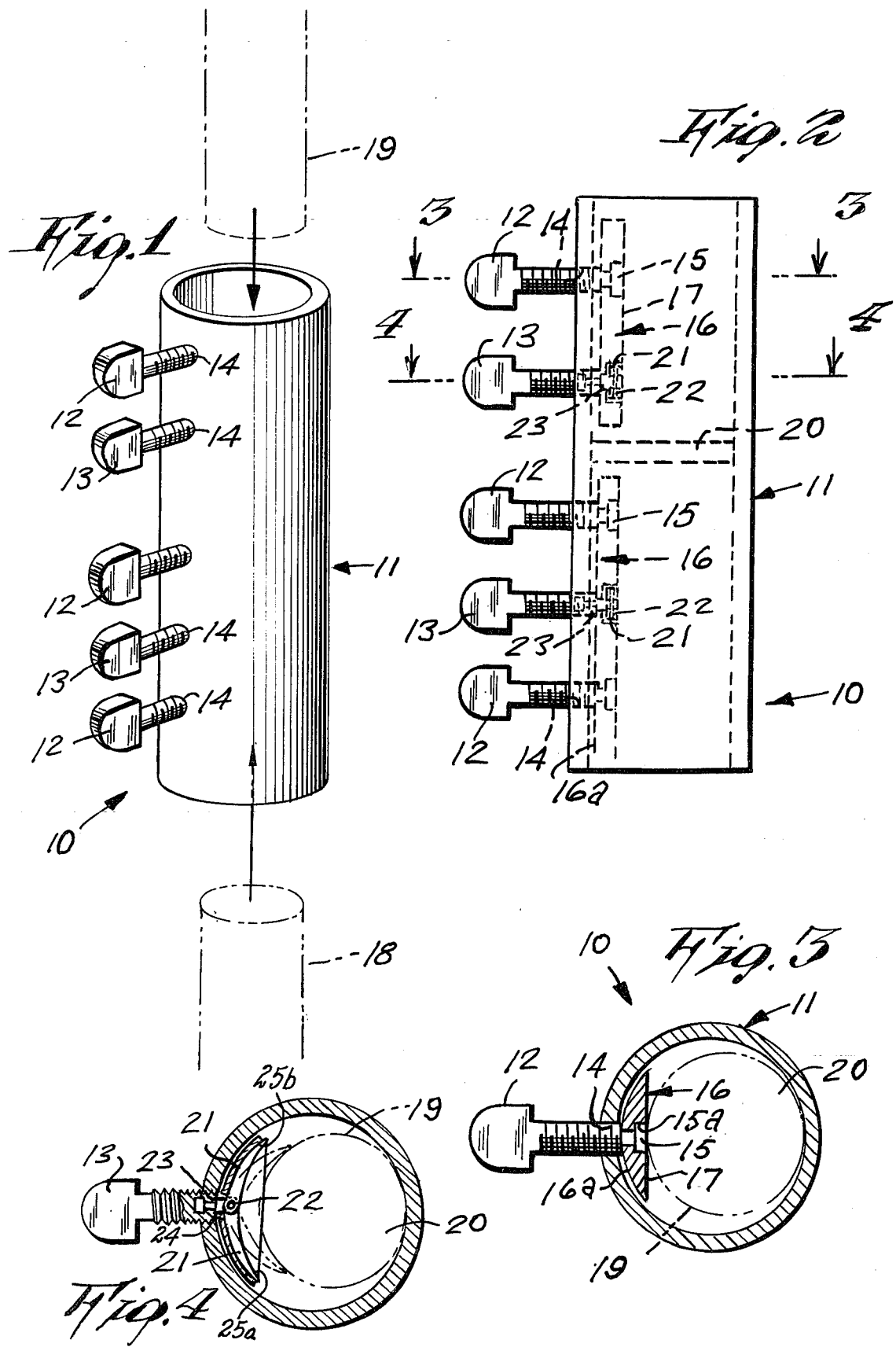

EXTENSION CONNECTOR

This invention relates to coupling devices, and more particularly, to an extension connector.

It is, therefore, the principal object of this invention to provide an extension connector, which will enable the user to secure any desired length shaft in one end, and will enable the user to secure a scraper, broom or paint brush in the other end.

Another object of this invention is to provide an extension connector, which will enable the user to paint, scrape or sweep high ceilings and over-hangs around a building, with little effort, in a minimum amount of time.

A further object of this invention is to provide an extension connector, which will enable the user to release any article or shaft from the device quickly.

Other objects are to provide an extension connector, which is simple in design, inexpensive to manufacture, rugged in construction, easy to use, and efficient in operation.

These, and other objects, will be readily evident, upon a study of the following specification, and the accompanying drawing, wherein:

FIG. 1 is a perspective view of the present invention, showing a shaft and a tool handle fragmentary and in phantom lines;

FIG. 2 is a side elevation of FIG. 1, showing the shaft and handle removed therefrom;

FIG. 3 is a cross-sectional view, taken along the line 3—3 of FIG. 2, and

FIG. 4 is a cross-sectional view, taken along the line 4—4 of FIG. 2, and shows a screw which is outwardly moved, so as to cause two pivoted arms to bear, at two sideward points, against the tool or extending shaft, thus preventing any side wobble, such as might occur if the tool, or shaft is grasped at only two diametrically opposite points.

According to this invention, a connector 10 is shown to include a sleeve 11, of metal or other suitable material. A plurality of thumb-screws 12 and 13 are threadingly received in threaded openings 14, through sleeve 11 at one side, and the heads 15, of thumb-screws 12, are received in recesses 15a of a pair of plates 16. Plates 16 are convex on one face 16a, and the opposite face 17 is flat, so as to bear against the shaft 18 or the handle 19 of a tool. An inner wall 20 is fabricated fixedly or integral with the interior of sleeve 11, and serves as stop means for the ends of handle 19 and shaft 18.

Referring now, particularly, to FIG. 4, a pair of arms 21 are pivotal on pin 22, in the heads 23 of thumb-screws 13, in order that, when screws 13 are drawn outwards, the arms 21 will grippingly engage against the outer periphery of shaft 18, and handle 19, so as to prevent any sideward wobble that may occur, when the handle 19 and shaft 18 are grasped at only two diametrically opposite points. As will be noted in FIG. 4, the heads 23 of the thumbscrews 13 extend through a space or aperture 24 centered between arcuate groove portions 25a and 25b in the plate 16. Thus, as the screws 13 move outward, the arms 21 adjacent the pin 22 fulcrum against the edges of the aperture 24 to cause the ends of the arms to make the two point contact shown in broken lines. However, when the screws 13 move inwardly, the arcuate surfaces of the arms 21 adjacent the pin 22 and extending outwardly therefrom contact the the shaft 18 or handle 19.

While various changes may be made in the detail construction, it is understood that such changes will be within the spirit and scope of the present invention, as is defined by the appended claims.

What I now claim is:

1. An extension connector for coupling the ends of a first and a second shaft comprising an open ended sleeve for receiving the ends of said first and second shafts, at least one threaded opening in said sleeve, the central axis of said threaded opening being substantially normal to the central axis of said sleeve, a threaded actuator means rotatably mounted in said threaded opening for movement into and outwardly of said sleeve, said threaded actuator means having an inner end positioned within said sleeve, a pair of arcuate-shaped arms each having a first free end and a second end, mounting means for mounting said arcuate-shaped arms for pivotal movement on and connection to the inner end of said actuator means, said arcuate shaped arms extending from opposite sides of the inner end of said actuator means, and fulcrum means mounted within said sleeve and between said sleeve and mounting means to contact said arcuate shaped arms and pivot said arms about the inner end of said actuator means to move the first free ends thereof toward one another and inwardly of said sleeve as said actuator means is moved outwardly relative to said sleeve.

2. The extension connector of claim 1 wherein said actuator means and fulcrum means are operative to move said arcuate shaped arms inwardly of said sleeve without pivotal movement thereof about the inner end of said actuator means when said actuator means is moved inwardly of said sleeve.

3. The extension connector of claim 2 wherein an inner wall is secured within said sleeve between the two open ends thereof to divide said sleeve into first and second sections.

4. The extension connector of claim 3 wherein threaded openings are formed in said sleeve to extend into both said first and second sections, each said threaded opening receiving an actuator means.

5. The extension connector of claim 4 wherein said fulcrum means includes an arcuate shaped plate means mounted adjacent the inner wall of said sleeve, said arcuate shaped plate means including an opening to receive the mounting means for said arcuate shaped arms, said mounting means extending through the opening into the interior of said sleeve.

* * * * *